Figure 1:
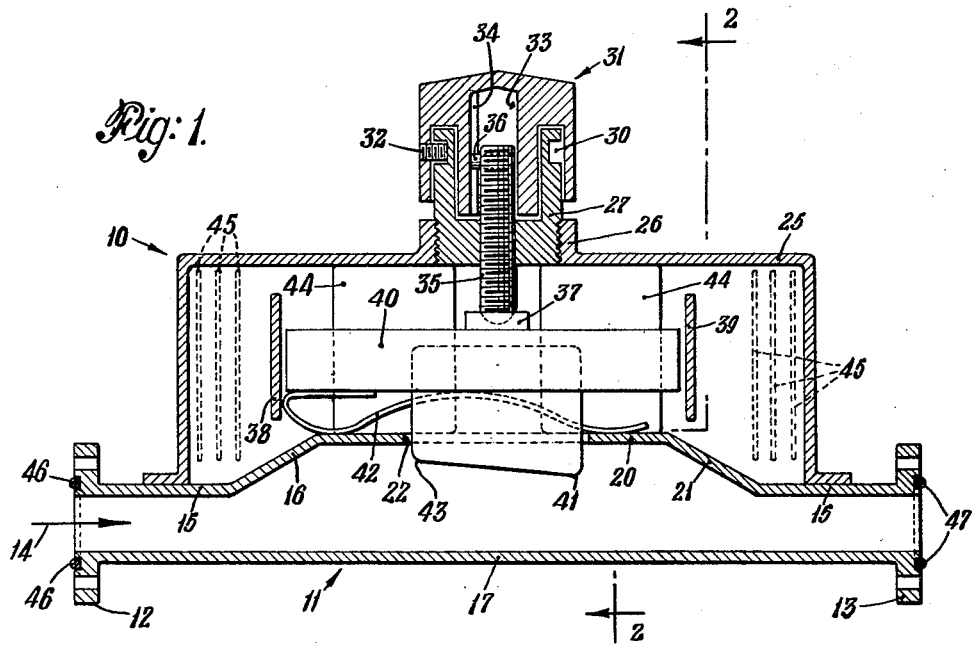

June 8, 1965 M. ZANICHKOWSKY 3,188,585
WAVEGUIDE ATTENUATOR WITH VANE MOVABLE
INTO HEIGHTENED PORTION OF WAVEGUIDE
Filed Aug. 28, 1963

INVENTOR.
MARTIN ZANICHKOWSKY
BY
ATTORNEY

United States Patent Office 3,188,585
Patented June 8, 1965

3,188,585
WAVEGUIDE ATTENUATOR WITH VANE MOVABLE INTO HEIGHTENED PORTION OF WAVEGUIDE
Martin Zanichkowsky, 6 Gulls Cove, Plandome Manor, N.Y.
Filed Aug. 28, 1963, Ser. No. 305,040
6 Claims. (Cl. 333—81)

This invention relates to wave guides for ultra-high-frequency or microwave transmission and more particularly to wave guide attenuators.

Heretofore, attenuation at high peak and high average power loads has not been directly performed, but rather has employed a multiple component structure that divided the power and ultimately used a wave guide dummy load as the dissipating element.

Accordingly, it is the object of this invention to provide a wave guide element that directly attenuates high peak and high average power electromagnetic wave energy.

It is another object of this invention to provide such a wave guide element that is capable of variable attenuation.

In carrying out this invention, there is provided a wave guide element having a central cavity that is heightened in the direction of the electric field lines and an attenuator element of high lossy material which is inserted through a slot formed in the wave guide wall into the central cavity by variable distances to vary the attenuation effect on the wave energy transmitted through the element.

Features and advantages of the invention will be gained from the foregoing and from the description of a preferred embodiment thereof which follows.

Figure 2:
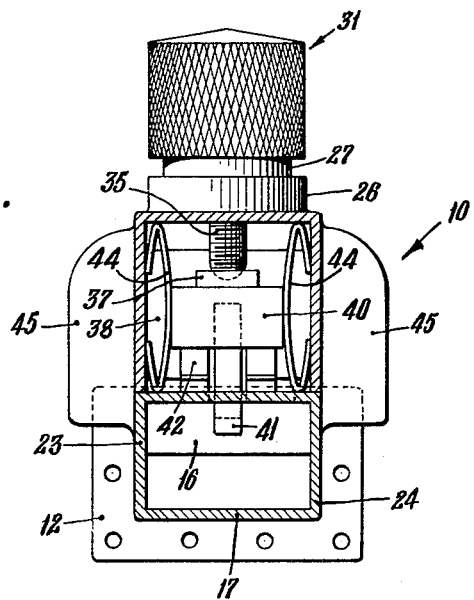

In the drawing:

FIG. 1 is a longitudinal sectional view of a wave guide attenuator according to the present invention; and, FIG. 2 is a view taken along line 2—2 of FIG. 1.

Referring to the drawing, a wave guide attenuator 10 is shown in sectional detail in FIG. 1 and the arrow 14 indicates the direction in which the electromagnetic wave is transmitted through the attenuator. The wave guide 11 itself is terminated at both ends with the flanges 12 and 13 whereby the attenuator may be joined to other wave guide elements. Of course, other suitable fittings could be provided for this purpose. The upper wall 15 of wave guide 11 is provided with a surface 16 that diverges from the bottom wall 17 until it meets the surface 20 which is parallel to but spaced farther from the bottom wall 17 than upper wall 15. Surface 20 is again joined to the upper wall 15 by a converging surface 21. An elongated slot 22 is provided in surface 20 midway betweeen the sidewalls 23 and 24 of the wave guide 11. As will later be seen an attenuator element is inserted into the wave guide through this slot.

It should be noted at this time that the diverging and converging surfaces, 16 and 21 respectively, are gradually merged into the upper wall 15 so as to minimize any mode disturbance to the electromagnetic wave caused by the change in shape of the wave guide. Also, while surface 20 is separated from bottom wall 17 to provide a heightened central cavity, the distance therebetween is not so great as to permit excitation of higher order propogating modes or to otherwise cause significant reflection of power directed opposite to arrow 14.

Atop the wave guide 11 is the attenuator housing 25 which may be brazed or otherwise fastened to the upper wall 15 of wave guide 11. The top of the housing is provided with an internally threaded boss 26 into which is threaded the cup-shaped member 27. Member 27 is formed with an annular groove near its top. A turning knob 31 is fitted over member 27 and a set screw 32 projecting inwardly from the knob extends into and rides in groove 30 as knob 31 is rotated. An axial bore 33 is provided in knob 31 and a longitudinal keyway 34 is cut along one side of the bore. A screw member 35 is threaded through cup-shaped member 27 and is adapted when turned to move upwardly and downwardly through member 27. A pin 36 is set in the upper portion of screw member 35 and it rides in keyway 34, the arrangement being such that as knob 31 is rotated, screw member 35 moves through member 27.

The bottom extremity of member 35 loosely engages a socket 37 formed on top of the block 40 which serves as a heat sink. Naturally, the block is formed of a highly heat conductive material such as copper or aluminum to better serve this purpose. An attenuator element 41 which is formed of a high thermal conductivity lossy material is embedded in the heat sink and is aligned with the slot 22 so that it may be inserted therethrough into wave guide 11. A pair of leaf springs 42, one on each side of the depending attenuator element 41, act between the surface 20 of wave guide 11 and block 40 to keep the block in engagement with the bottom extremity of screw member 35. In this way the position of the attenuator element in wave guide 11 and hence the degree of attenuation of the electromagnetic wave, is determined by the position of screw member 35 which in turn is determined by tthe position of knob 31. A pair of webs, 38 and 39, formed on the inside of housing 25 limit the longitudinal movement of block 40 and hence attenuator element 41 in the wave guide. With the mechanism disclosed a resolution or resettability within 0.1 decibel is attainable.

By referring to FIG. 1 it will be noted that the bottom edge of attenuator element 41 is not parallel to the bottom wall 17 of wave guide 11 but rather is inclined thereto. In this manner, assuming that attenuator element 41 is located externally to wave guide 11, when the element is projected through slot 22 and into the wave guide the trailing edge of the element enters the guide first. This is further assured by the fact that screw member 35 engages socket 37 which is located slightly eccentric and behind where the arch of spring 42 engages block 40. Thus, as element 41 descends it is very gradually introduced so that the attenuation is very slowly increased. It should also be noted that the leading corner 43 of the attenuator element is rounded so as to minimize the electric field concentration of the electromagnetic field as the leading corner enters the wave guide proper. This aids in avoiding arc overs under peak power handling conditions. This characteristic is enhanced by the fact that the attenuation is taking place at the heightened central cavity of the wave guide and that the initial attenuation takes place in the fringe field of the slot 22.

The heat developed in the attenuator element 41 as the element is introduced into the electromagnetic field is first absorbed in heat sink 40 and then it is conducted to housing 25 by spring-like elements 44 that bear against block 40 and housing 25. Housing 25 may be provided with radiating fins 45 to aid in the dissipation of the heat developed during attenuation of the electromagnetic wave.

It will be well to conclude with a listing of the characteristics of the wave guide attenuator provided in accordance with the present invention. The attenuator is intended to operate over a frequency range of 26,500 to 40,000 megacycles and is capable of handling 40 kilowatts of peak power and 20 watts average power. The voltage standing wave ratio over the frequency band is 1.25 and the insertion loss is 0.20 decibel maximum. The attenuation range is 0 to 10 decibels and as previously noted a resolution of 0.1 decibel is attainable.

The foregoing parameters are obtained in the structure shown and without the use of air pressure. However, the provision of proper O-rings 46 and 47 on flanges 12 and 13, respectively permit pressurization of the attenuator in which case the peak power handling ability of the attenuator increases to 100 kilowatts. Of course, if housing 25 is not brazed to wave guide 11 so that the joint between them is not air-tight then a gasket has to be provided to permit pressurization.

The principles underlying the present invention are applicable to all wave guides regardless of type, size and frequency range thereof.

Having thus described the invention it is to be understood that many changes could be made to the preferred embodiment disclosed without departing from the spirit and scope of the invention and, therefore, the description and drawing are to be interpreted in an illustrative rather than a limiting sense.

What is claimed is:

1. A wave guide attenuator comprising, a rectangular wave guide having a heightened central section in which the top and the bottom walls of the wave guide are separated by a greater distance than in the remainder of the wave guide, the top wall of said central section being provided with a slot, an attenuator element, and means for moving said attenuator element through said slot and into the heightened central section of the wave guide.

2. A wave guide attenuator according to claim 1 wherein the attenuator element is rectilinearly moved into the wave guide and the bottom edge of the attenuator element is inclined with respect to the bottom wall of the wave guide.

3. A wave guide attenuator according to claim 1 wherein the leading corner of the bottom edge of the attenuator element is rounded to minimize the possibility of arc over as said corner is introduced into the wave guide.

4. A wave guide attenuator according to claim 1 including a heat sink member and wherein the upper edge of the attenuator element is embedded in said member.

5. A wave guide attenuator according to claim 1 wherein the means for moving the attenuator element comprises a screw member for positiviely moving said element into the wave guide and resilient means for urging said element into engagement with said screw member.

6. A wave guide attenuator according to claim 5 wherein the screw member and the resilient means act on said attenuator element so as to urge the trailing corner of the bottom edge of the attenuator element to enter the wave guide first.

References Cited by the Examiner

UNITED STATES PATENTS

| 2,496,837 | 2/50 | Woodyard | 333—81 |
| 2,542,185 | 2/51 | Fox | 333—22 X |
| 2,765,445 | 10/56 | Zaleski | 333—81 |
| 2,822,526 | 2/58 | Wallace | 333—81 X |

FOREIGN PATENTS

| 617,919 | 2/49 | Great Britain. |
| 647,234 | 12/50 | Great Britain. |

HERMAN KARL SAALBACH, *Primary Examiner.*